United States Patent [19]

Nakamura et al.

[11] Patent Number: 5,622,144

[45] Date of Patent: Apr. 22, 1997

[54] SYSTEM FOR OPERATING INTERNAL COMBUSTION ENGINE

[75] Inventors: Makoto Nakamura, Zushi; Tetsuro Goto, Hatano; Shinichi Takemura, Fujisawa, all of Japan

[73] Assignee: Nissan Motor Co., Ltd., Yokohama, Japan

[21] Appl. No.: 432,852

[22] Filed: May 2, 1995

[30] Foreign Application Priority Data

May 2, 1994 [JP] Japan .................................. 6-093190

[51] Int. Cl.$^6$ ........................................................ F01L 13/00
[52] U.S. Cl. ................................. 123/90.15; 123/90.17
[58] Field of Search ............................. 123/90.15, 90.16, 123/90.17, 90.31

[56] References Cited

U.S. PATENT DOCUMENTS

| | | | |
|---|---|---|---|
| 4,741,297 | 5/1988 | Nagahiro et al. | 123/90.16 |
| 4,993,370 | 2/1991 | Hashiyama et al. | 123/90.31 |
| 5,031,583 | 7/1991 | Konno | 123/90.17 |
| 5,159,905 | 11/1992 | Sugiuchi et al. | 123/90.16 |
| 5,181,485 | 1/1993 | Hirose et al. | 123/90.17 |
| 5,184,581 | 2/1993 | Aoyama et al. | 123/90.15 |
| 5,224,460 | 7/1993 | Havstad et al. | 123/568 |
| 5,230,320 | 7/1993 | Hitomi et al. | 123/559.1 |
| 5,293,741 | 3/1994 | Kashiyama et al. | 123/90.15 |
| 5,301,636 | 4/1994 | Nakamura | 123/90.16 |
| 5,333,579 | 8/1994 | Hara et al. | 123/90.31 |
| 5,365,896 | 11/1994 | Hara et al. | 123/90.31 |
| 5,370,090 | 12/1994 | Murata et al. | 123/90.16 |
| 5,421,308 | 6/1995 | Hitomi et al. | 123/90.15 |

*Primary Examiner*—Weilun Lo
*Attorney, Agent, or Firm*—Foley & Lardner

[57] ABSTRACT

A system for operating an internal combustion engine including an intake valve and an exhaust valve, the system including an exhaust valve gear for the exhaust valve which incorporates an exhaust variable valve timing mechanism. The system also includes an intake valve gear for the intake valve which incorporates an intake variable valve timing mechanism. A control unit operates responsive to a low-speed/low-load operating range of the engine and a low-speed/high-load operating range of the engine to condition the exhaust variable valve timing mechanism for providing advanced opening and closing timings of the exhaust valve to cause a reduced valve overlap between the intake and exhaust valves, and at the same time condition the intake variable valve timing mechanism for decreasing an opening duration of the intake valve to provide a retarded opening timing thereof after a top dead center and an advanced closing timing thereof. The control unit operates responsive to a low-speed/medium-load operating range of the engine to condition the exhaust variable valve timing mechanism for providing retarded opening and closing timings of the exhaust valve to cause an increased valve overlap between the intake and exhaust valves, and at the same time condition the intake variable valve timing mechanism for increasing the opening duration of the intake valve to provide an advanced opening timing thereof before the top dead center and a retarded closing timing thereof.

11 Claims, 11 Drawing Sheets

SYSTEM FOR OPERATING INTERNAL COMBUSTION ENGINE

BACKGROUND OF THE INVENTION

The present invention relates to a system for operating an internal combustion engine.

Various attempts have been made to improve performance of an internal combustion engine.

Japanese Patent Application Second Publication No. 2-43004 discloses a system for operating an internal combustion engine, in which opening and closing timings for an intake valve or exhaust valve and valve lift thereof are variably controlled under low-speed and high-speed operating conditions of the engine.

An object of the present invention is to improve a performance of the engine, and especially to achieve a stable engine operation within low-speed/low-load operating range and an improved fuel economy at low-speed/medium-load operating range in which the engine is often operated during driving in an urban area.

SUMMARY OF THE INVENTION

According to one aspect of the present invention, there is provided a system for operating an internal combustion engine including an intake valve and an exhaust valve, the system comprising:

an exhaust valve gear for the exhaust valve, the exhaust valve gear incorporating an exhaust variable valve timing mechanism;

an intake valve gear for the intake valve, the intake valve gear incorporating an intake variable valve timing mechanism; and means operatively responsive to a low-speed/low-load operating range of the engine and operatively responsive to a low-speed/high-load operating range of the engine to condition the exhaust variable valve timing mechanism for providing advanced opening and closing timings of the exhaust valve, and at the same time condition the intake variable valve timing mechanism for decreasing an opening duration of the intake valve to provide a retarded opening timing thereof and an advanced closing timing thereof to cause a reduced valve overlap between the intake and exhaust valves, whereby an increased emission via the exhaust valve and a stable combustion are performed;

the means being operatively responsive to a low-speed/medium-load operating range of the engine to condition the exhaust variable valve timing mechanism for providing a retarded opening timing of the exhaust valve immediately before a bottom dead center and a retarded closing timing thereof, and at the same time condition the intake variable valve timing mechanism for increasing the opening duration of the intake valve to provide an advanced opening timing thereof and a retarded closing timing thereof to cause an increased valve overlap between the intake and exhaust valves a peak of which is positioned after a top dead center, whereby reduction of pumping loss and improved fuel economy are achieved.

According to a further aspect of the present invention, there is provided a system for operating an internal combustion engine including an intake valve and an exhaust valve, the system comprising:

an exhaust valve gear for the exhaust valve, the exhaust valve gear incorporating an exhaust variable valve timing mechanism, the exhaust variable valve timing mechanism being operative to move opening and closing timings of the exhaust valve with a predetermined opening duration of the exhaust valve; and an intake valve gear for the intake valve, the intake valve gear incorporating an intake variable valve timing mechanism, the intake variable valve timing mechanism being operatively to alter an opening duration of the intake valve;

the intake variable valve timing mechanism including a driver shaft having an axis and rotatable about the axis in timed relation with an engine operation, an intake camshaft disposed coaxially with the axis of the driver shaft, and means operatively responsive to operating ranges of the engine to control rotation of the intake camshaft;

the means being operatively responsive to a low-speed/low-load operating range of the engine and a low-speed/high-load operating range of the engine to control the intake camshaft for ununiform rotation of the intake camshaft relative to the driver shaft to provide a reduced valve opening duration of the intake valve;

the means being operatively responsive to a low-speed/medium-load operating range of the engine to control the intake camshaft for uniform rotation of the intake camshaft relative to the driver shaft to provide an increased valve opening duration of the intake valve.

According to another aspect of the present invention, there is provided a method for operating an internal combustion engine with an exhaust phase and an intake phase, the method comprising the steps:

providing, responsive to a low-speed/low-load operating range of the engine and a low-speed/high-load operating range of the engine, the exhaust phase having an advanced commencement and an advanced termination with a predetermined duration, and at the same time providing, responsive to the low-speed/low-load operating range of the engine and the low-speed/high-load operating range of the engine, the intake phase in a reduced duration to cause a delayed commencement thereof and an advanced termination thereof to reduce overlap between the intake and exhaust phases; and providing, responsive to the low-speed/medium-load operating range of the engine, the exhaust phase having a delayed commencement thereof and a delayed termination thereof with a predetermined duration, and at the same time providing, responsive to the low-speed/medium-load operating range of the engine, the intake phase in an increased duration to cause an advanced commencement thereof and a delayed termination thereof to increase overlap between the intake and exhaust phases.

According to a further aspect of the present invention, there is provided a method for operating an internal combustion engine including an intake valve and an exhaust valve, the method comprising the steps of:

providing, responsive to a low-speed/low-load operating range of the engine and a low-speed/high-load operating range of the engine, advanced opening and closing timings of the exhaust valve, and at the same time providing, responsive to the low-speed/low-load operating range of the engine and the low-speed/high-load operating range of the engine, a reduced opening duration of the intake valve to provide a retarded opening timing thereof and an advanced closing timing thereof to cause a reduced valve overlap between the intake and exhaust valves; and providing, responsive to a low-speed/medium-load operating range of the engine, a retarded opening timing of the exhaust valve immediately before a bottom dead center and a retarded closing timing thereof, and at the same time providing, responsive to the low-speed/medium-load operating range of the engine, an increased opening duration of the intake valve to provide an advanced opening timing thereof and a retarded closing timing thereof to cause an increased valve overlap between the intake and exhaust valves.

According to still further aspect of the present invention, there is provided a method for operating an internal combustion engine including an intake valve and an exhaust valve, the method comprising the steps of:

opening, responsive to a low-speed/low-load operating range of the engine and a low-speed/high-load operating range of the engine, the exhaust valve at advanced opening and closing timings, at the same time opening and closing, responsive to the low-speed/low-load operating range of the engine and the low-speed/high-load operating range of the engine, the intake valve in a reduced opening duration to provide a retarded opening timing thereof and an advanced closing timing thereof to cause a reduced valve overlap between the intake and exhaust valves;

opening, responsive to a low-speed/medium-load operating range of the engine, the exhaust valve at a retarded opening timing immediately before a bottom dead center and a retarded closing timing, and at the same time opening and closing, responsive to the low-speed/medium-load operating range of the engine, the intake valve in an increased opening duration to provide an advanced opening timing thereof and a retarded closing timing thereof to cause an increased valve overlap between the intake and exhaust valves.

DETAILED DESCRIPTION OF THE INVENTION

Referring to the accompanying drawings, one preferred embodiment of an engine operating system according to the present invention is described. The system is applicable to an internal combustion engine of the double overhead cam (DOHC) type.

Figure 1:
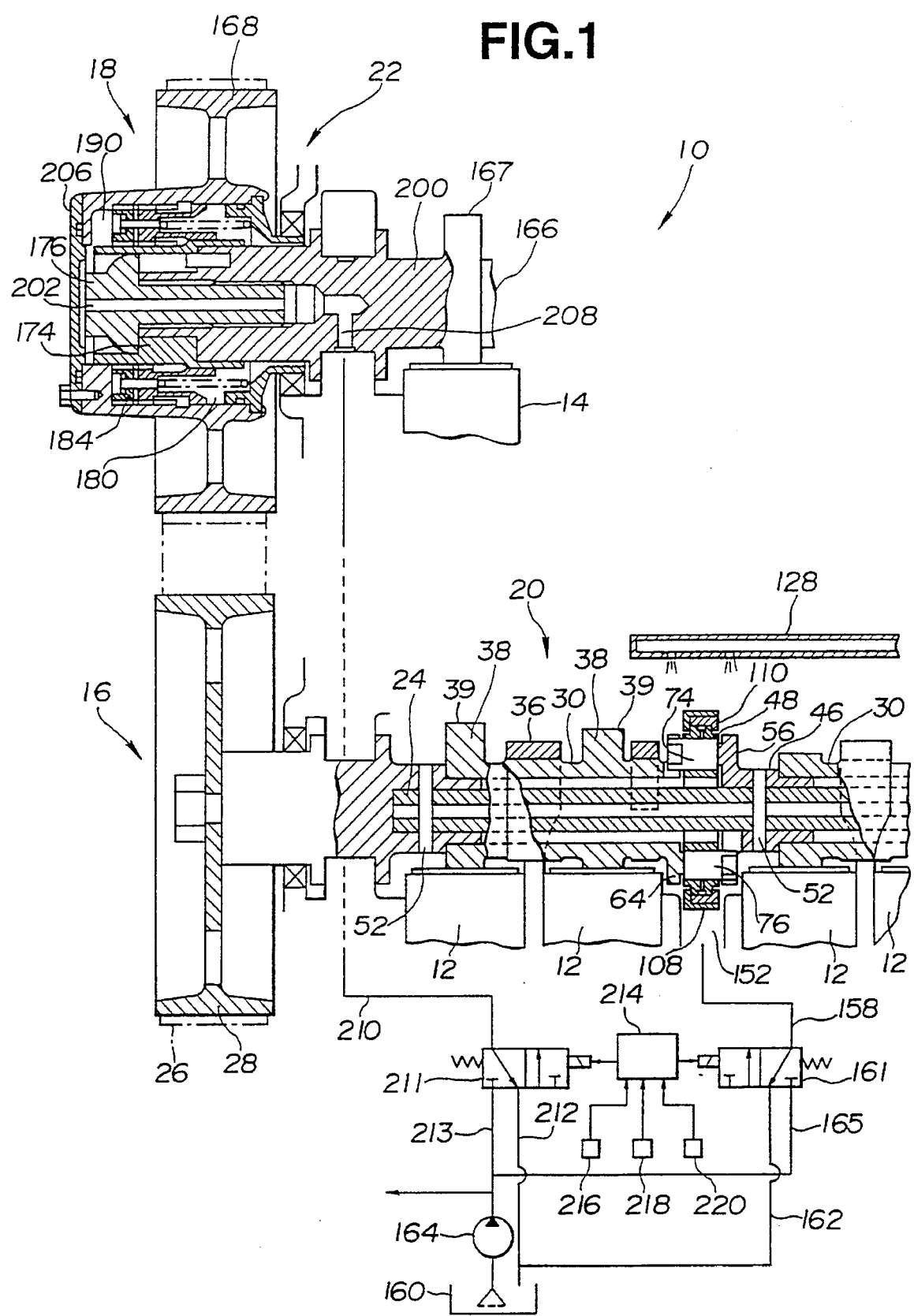
FIG. 1 is a fragmentary sectional view of a system for operating an internal combustion engine, according to the present invention, showing an intake variable valve timing mechanism and an exhaust variable valve timing mechanism along with a circuit diagram.

As illustrated in FIG. 1, the system is applied to an internal combustion engine 10 including an intake valve 12 and an exhaust valve 14. The system comprises an intake valve gear 16 for the intake valve 12 and an exhaust valve gear 18 for the exhaust valve 14. The intake valve gear 16 incorporates an intake variable valve timing mechanism 20 and the exhaust valve gear 18 incorporates an exhaust variable valve timing mechanism 22.

Referring to FIGS. 2–7, the intake variable valve timing mechanism 20 is now explained in detail.

Figure 2:
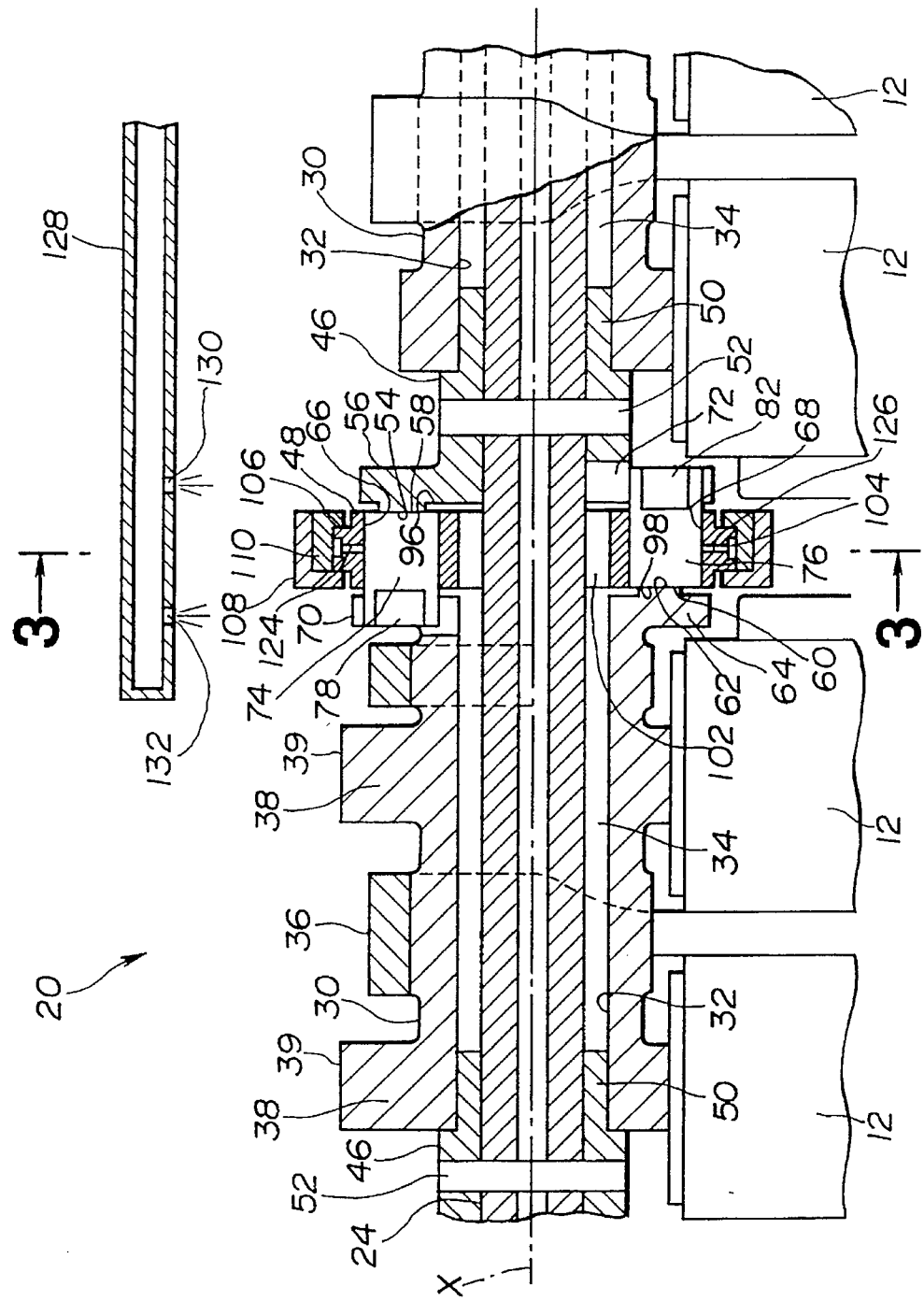
FIG. 2 is an enlarged partial view of FIG. 1, showing the intake variable valve timing mechanism including a driver shaft and an intake camshaft.
Figure 3:
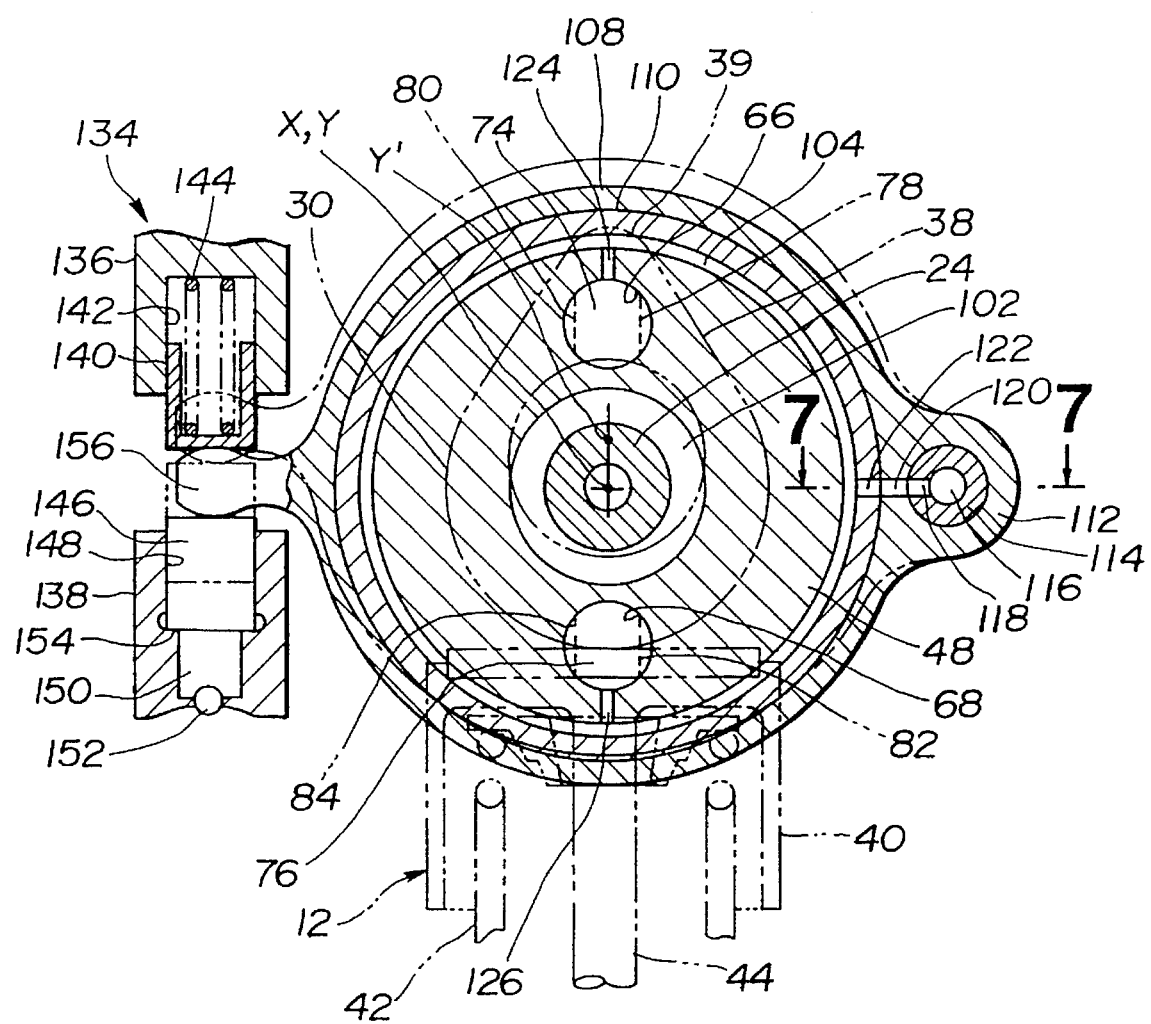
FIG. 3 is a sectional view taken along the line 3—3 of FIG. 2.
Figure 4:
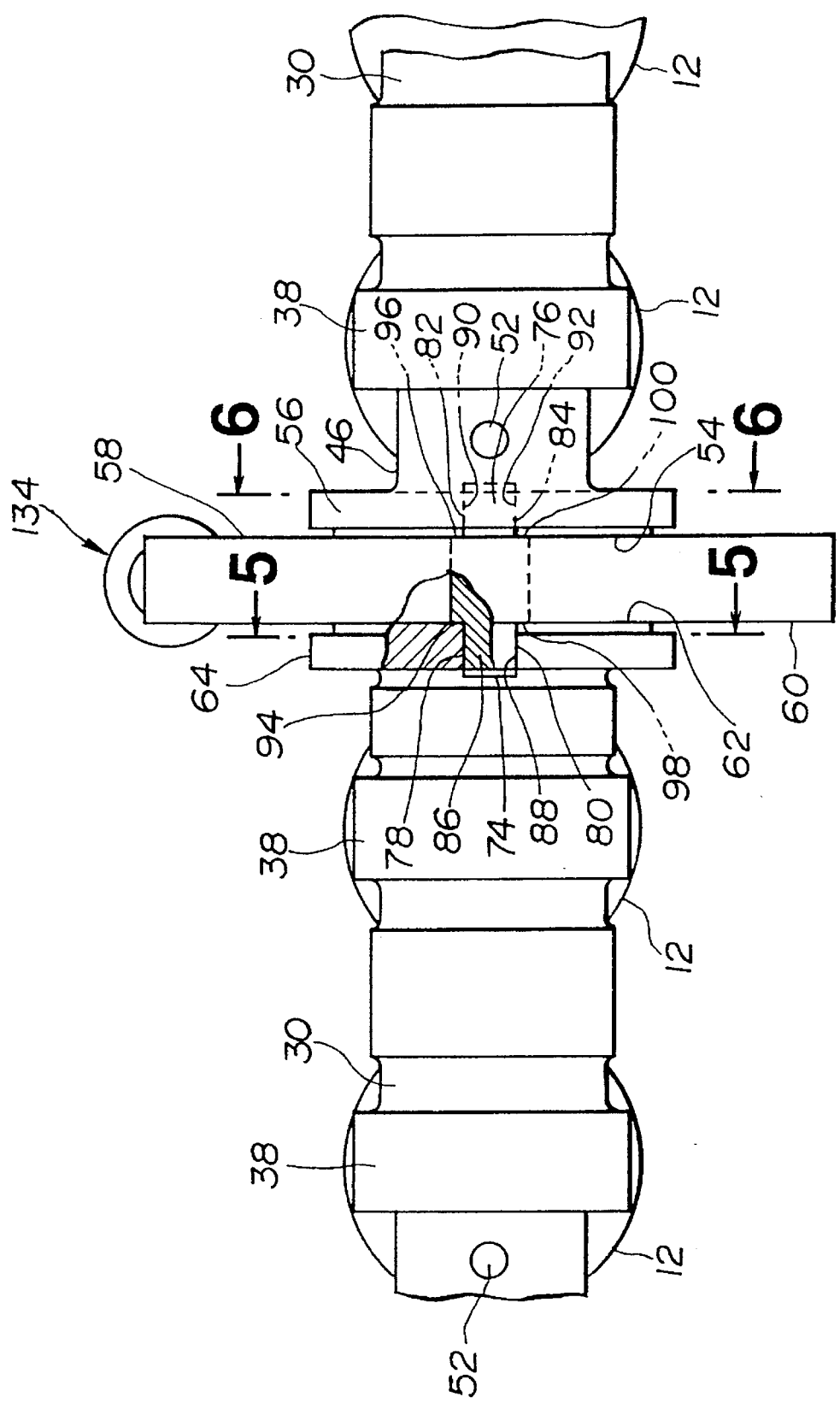
FIG. 4 is a plan view of FIG. 2.

As best shown in FIG. 2, the intake variable valve timing mechanism 20 includes a driver shaft 24 having an axis X and rotatable about the axis X in timed relation with an engine operation. The driver shaft 24 is so constructed and arranged as to be driven by an engine crankshaft, not shown, via a timing belt 26 and an intake cam pulley 28 illustrated in FIG. 1. An intake camshaft 80 is disposed coaxially with the axis X of the driver shaft 24. The intake camshaft 80 is in the form of a plurality of hollow cylindrical portions axially spaced apart at a predetermined distance from each other. The intake camshaft 80 has a bore 82 receiving the driver shaft 24. There is an annular space 84 between an inner peripheral surface of the intake camshaft 80 and an outer peripheral surface of the driver shaft 24. The intake camshaft 30 is rotatably held above a cylinder head, not shown, by a cam bearing 86. Each of the cylindrical portions of the intake camshaft 30 is arranged for each cylinder, not shown, and formed with axially spaced integral intake cams 88, as shown in FIGS. 2 and 4. Each of the intake cams 38 has a profile indicated in phantom line of FIG. 3 and actuates the intake valve 12 to open by urging a valve lifter 40 indicated in phantom line of FIG. 8. The intake valve 12 is always biased via the valve lifter 40 by a return spring 42 in such a direction as to close the intake valve 12. In FIG. 3, reference numeral 44 denotes a valve stem.

Figure 5:
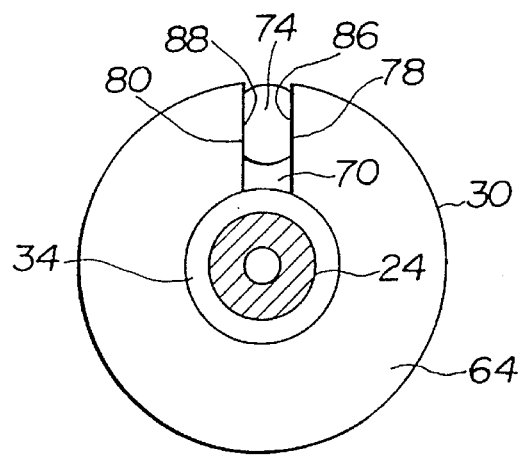
FIG. 5 is a sectional view taken along the line 5—5 of FIG. 4.
Figure 6:
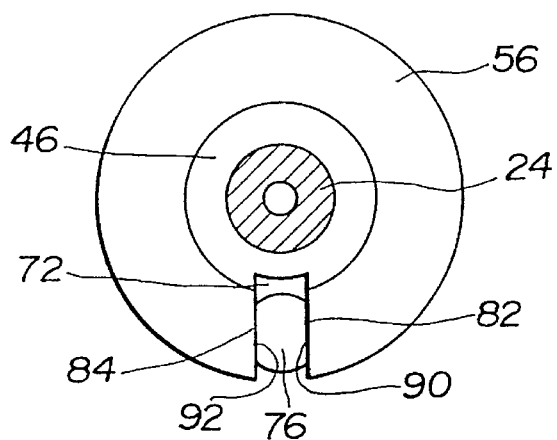
FIG. 6 is a sectional view taken along the line 6—6 of FIG. 4.

As illustrated in FIGS. 1, 2 and 4, a sleeve 46 and an annular disk 48 are disposed between the two adjacent cylindrical portions of the intake camshaft 80 in a coaxial relation therewith. As best shown in FIG. 2, the sleeve 46 has a reduced diameter portion 50 received in the annular space 84. The sleeve 46 is connected with the driver shaft 24 by a pin 52 radially extending through the driver shaft 24 and the sleeve Thus, the sleeve 46 is rotatable together with the driver shaft 24. The sleeve 46 has an axial end face 54 at a flanged end portion 56 thereof which is in contact with one axial end face S8 of the annular disk 48. The annular disk 48 has the opposite axial end face 60 which is in contact with an axial end face 62 of the intake camshaft 30. The annular disk 48 has generally the same inner diameter as an inner diameter of the intake camshaft 30. The axial end face 62 is disposed on a flanged portion 64 integrally formed at one end of each cylindrical portion of the intake camshaft 30. The annular disk 48 has a pair of axial through-holes 66 and 68 arranged in a diametrically opposed relation to each other with respect to the axis X, as shown in FIG. 3. These through-holes 66 and 68 are aligned with radial grooves 70 and 72 which are formed on the flanged portion 64 of the intake camshaft 30 and the flanged end portion 56 of the sleeve 46, respectively, as illustrated in FIGS. 5 and 6. The annular disk 48 is in driving connection with the driver shaft 24 and the intake camshaft 70 through pins 74 and 76 shown in FIG. 2. The pins 74 and 76 are received rotatably in the through-holes 66 and 68 and slidably in the grooves 70 and 72, respectively. As illustrated in FIGS. 5 and 6, the pin 74 has opposing flat faces 78 and 80 at its left portion as viewed in FIG. 2, extending through the groove 70, and the pin 76 has opposing flat faces 82 and 84 at its right portion as viewed in FIG. 2, extending through the groove 72. The flat faces 78 and 80 contact opposing peripheral faces 86 and 88 of the groove 70. The flat faces 82 and 84 contact opposing peripheral faces 90 and 92 of the groove 72. The pin 74 is prevented from its axial movement in one direction, leftward as viewed in FIG. 4, by engagement of a shoulder portion 94 thereof with the axial end face 62 of the intake camshaft 30 and from its axial movement in the opposite direction, rightward as viewed in FIG. 4, by engagement of an axial end face 96 thereof with the axial end face 54 of the sleeve 46. The pin 76 is prevented from its axial movement in one direction, leftward as viewed in FIG. 4, by engagement of an axial end face 98 thereof with the axial end face 62 of the intake camshaft 30 and in the opposite direction, rightward as viewed in FIG. 4, by engagement of a shoulder portion 100 thereof with the axial end face 54 of the sleeve 46.

The annular disk 48 has an axis indicated at Y of FIG. 3 and is moveable relative to the axis X of the driver shaft 24 as described in detail hereinafter. The annular disk 48 has a first or concentric position in which the axis Y of the annular disk 48 is aligned with the axis X of the driver shaft 24 and a second or eccentric position in which the axis Y of the annular disk 48 is offset to a position as indicated at Y' of FIG. 3, from the axis X of the driver shaft 24. As shown in FIGS. 2 and 3, the annular disk 48 has an inner diameter substantially equal to an inner diameter of the intake camshaft 30 to produce an annular space 102 between an inner peripheral surface of the annular disk 48 and the outer peripheral surface of the driver shaft 24. The annular disk 48 has an annular oil passage 104 which is formed on an outer peripheral surface of its radially outwardly projecting portion 106 having a reduced axial length. A cylindrical disk driver 108 is coaxially disposed with the annular disk 48. Reference numeral 110 denotes a bearing interposed between the disk driver 108 and the annular disk 48. As illustrated in FIG. 3, the disk driver 108 has a radially outwardly projecting hub portion 112 receiving a rod 114.

Figure 7:
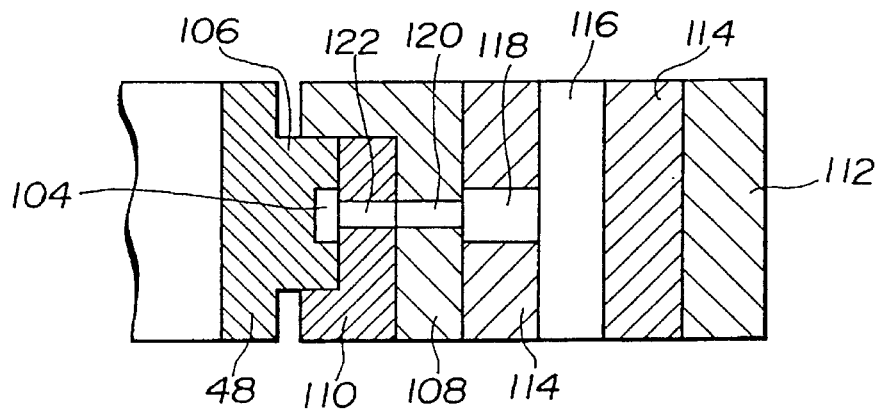
FIG. 7 is a sectional view taken along the line 7—7 of FIG. 3.

The rod 114 is pivotally mounted to a stationary portion (not shown) of the engine cylinder. The disk driver 108 is fixedly supported on the rod 114 to be moveable along a plane perpendicular to the axis X of the driver shaft 24. As best shown in FIG. 7, the rod 114 has an oil passage 116 fluidly communicating with the annular oil passage 104 via a radial oil passage 118 of the rod 114, a radial oil passage 120 of the disk driver 108, and a radial oil passage 122 of the bearing 110. Lubricating oil is fed through an oil gallery, not shown, to these oil passages 116, 118, 120, 122 and 104 for providing smooth relative rotation between the annular disk 48 and the disk driver 108 with the bearing 110. Oil passages 124 and 126 shown in FIG. 3 extend radially inwardly from the annular oil passage 104 to fluidly communicate with the axial through-holes 66 and 68 for providing lubrication between the pins 74 and 76 and wall portions of the annular disk 48 which define the through-holes 66 and 68. Lubrication between the pin 74 and the radial groove 70 of the intake camshaft 30 and between the pin 76 and the radial groove 72 of the sleeve 46 is provided by an oil supply pipe 128 disposed over the driver shaft 24 and the intake camshaft 30 in a parallel relation therewith as shown in FIG. 2. The oil supply pipe 128 is formed with oil outlets 130 and 132 which are respectively directed to the flanged end portion 56 of the sleeve 46 and to the flanged portion 64 of the intake camshaft 30. Lubricating oil is supplied through the oil outlets 130 and 132 to the flanged end portions 56 and 64 having the corresponding radial grooves 72 and 70, respectively.

Referring to FIGS. 3 and 4, a disk driver actuating mechanism 134 for actuating the disk driver 108 is now explained. As illustrated in FIG. 3, the disk driver actuating mechanism 134 includes a first cylinder 136 and a second cylinder 138 disposed in opposed and concentrical relation. The first and second cylinders 136 and 138 are disposed on the cylinder head, not shown. A retainer 140 of a generally cylindrical shape is arranged in a bore 142 of the first cylinder 136. The retainer 140 is biased by a return spring 144 acting between opposing bottom walls of the cylinder 136 and retainer 140, in such a direction as to project outwardly from the first cylinder 136. A piston 146 is slidably mounted in a bore 148 of the second cylinder 138 and normally urged by bias of the return spring 144 to a rest position as indicated in full line of FIG. 3, in which the piston 146 bears against a shoulder portion 154 formed in the bore 148. The piston 146 is prevented from its sliding movement in a retracting or downward as viewed in FIG. 3, direction by abutting against the shoulder portion 154. A hydraulic pressure chamber 150 is defined within the bore 148 to be supplied via a port 152 with a hydraulic pressure for moving the piston 146 from the rest position to a projecting position indicated in broken line of FIG. 3. Disposed between the piston 146 and the retainer 140 is a lever portion 156 of the disk driver 108. The lever portion 156 extending radially outwardly from an outer peripheral surface of the disk driver 108 is disposed in diametrically opposed relation to the hub portion 112. When hydraulic pressure is built-up in the hydraulic pressure chamber 150, the piston 146 shifts from the rest position to the projecting position against bias of the return spring 144. This causes the lever portion 156 to be moved between a position indicated in full line of FIG. 3 and a position indicated in broken line of FIG. 3. The disk driver 108 pivots about the rod 114 during the movement of the lever portion 156. During the pivotal movement of the disk driver 108, the annular disk 48 is moved between the first and second positions by the sliding motion of the pins 74 and 76 in the corresponding grooves 70 and 72. The intake cam 38 is so contoured as to have a lobe 39 which provides a predetermined maximum valve lift when the lobe 39 of the cam 38 is brought at its peak portion into contact with the valve lifter 40.

A manner of controlling the hydraulic pressure within the hydraulic pressure chamber 150 is explained by referring back to FIG. 1. As shown in FIG. 1, the hydraulic pressure chamber 150 is communicated via the port 152 with a hydraulic line 158. The hydraulic line 158 is connected via a first hydraulic pressure control valve 161 to a recirculating line 162 which is connected to an oil pan 160. The hydraulic line 158 is also connected via the control valve 161 to a hydraulic line 165 which is connected to an oil pump 164. The oil pump 164 is connected with the oil pan 160. The first hydraulic pressure control valve 161 is in the form of a three-port two-position type. Generally, this hydraulic circuit is provided in a lubricating system of the engine, wherein the oil pump 164 is used in common.

Figure 8:
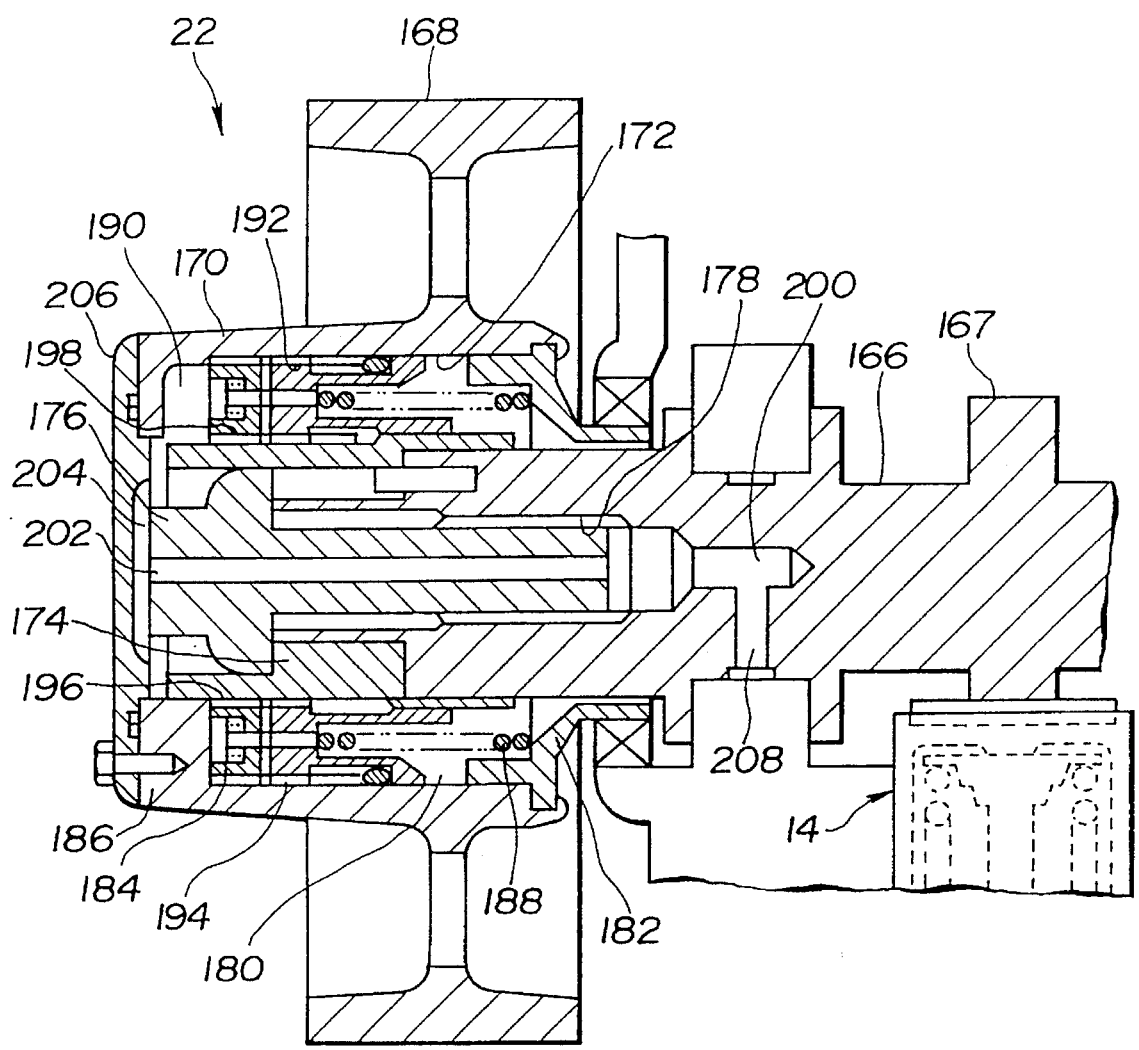
FIG. 8 is an enlarged fragmentary sectional view of FIG. 1, showing the exhaust variable valve timing mechanism in an operational state.
Figure 9:
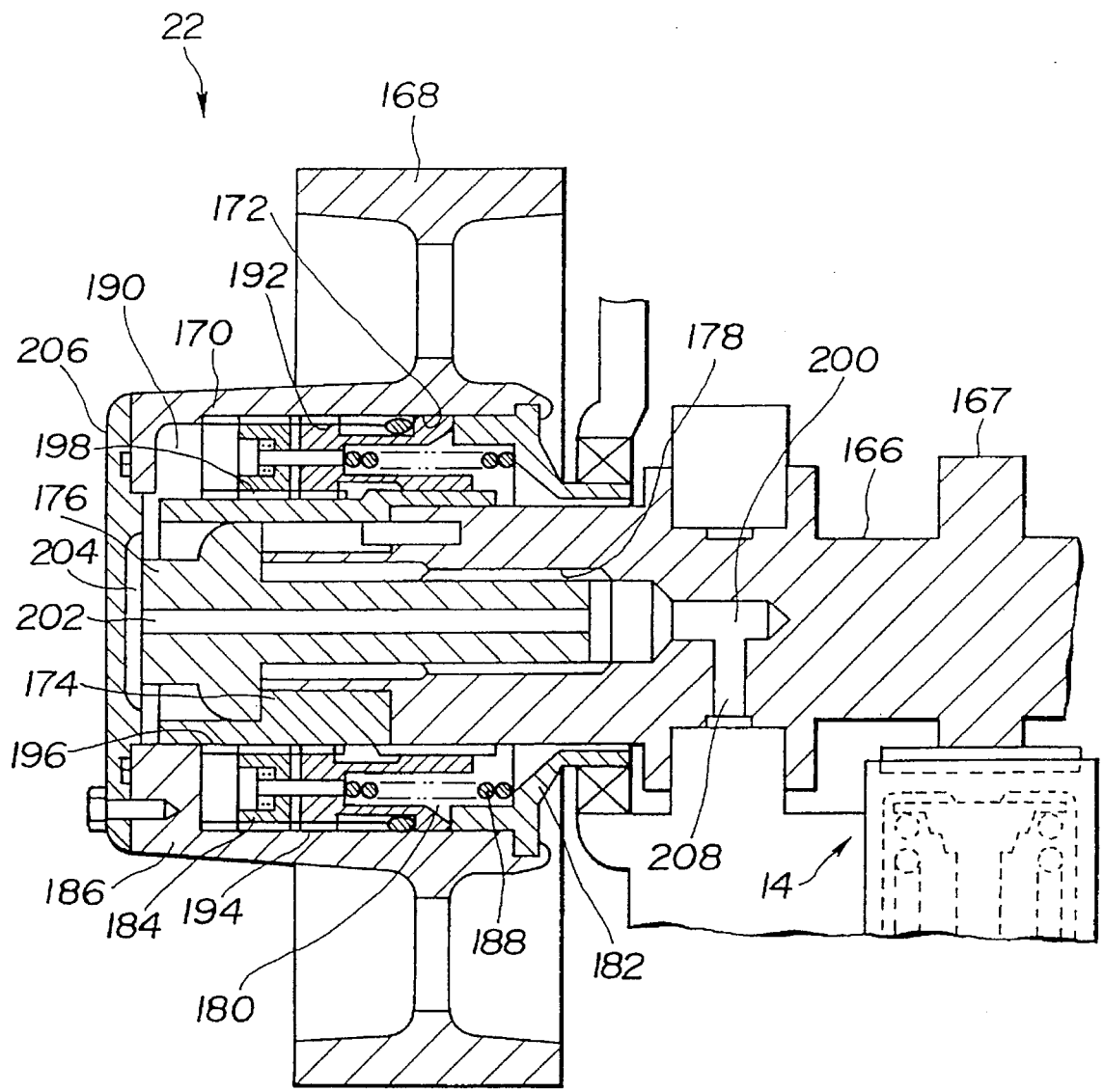
FIG. 9 is a view similar to FIG. 8 but showing the exhaust variable valve timing mechanism in an operational state different from FIG. 8.

Referring to FIGS. 1, 8 and 9, the exhaust variable valve timing mechanism 22 is now explained.

The exhaust variable valve timing mechanism 22 includes an exhaust camshaft 166 disposed substantially parallel to the intake camshaft 30 as illustrated in FIG. 1. The exhaust camshaft 166 has a plurality of integral exhaust cams 167 in axially spaced relation, one of which is shown in FIG. 1. Each pair of the exhaust cams 167 are disposed for each cylinder of the engine 10. The exhaust camshaft 166 has one end coupled with an exhaust cam pulley 168. The exhaust cam pulley 168 is connected with the engine crankshaft together with the intake camshaft 30 via the timing belt 28.

As best shown in FIG. 8, the exhaust cam pulley 168 is formed with a hub 170 having a cylindrical wall 172. Rotatably disposed in the hub 170 is a sleeve 174 fixedly attached to an end portion of the exhaust camshaft 166 by a fastening bolt 176. The bolt 176 is received in a bore section 178 formed within the end portion of the exhaust camshaft 166. The sleeve 174 is radially spaced from the cylindrical wall 172 to define therebetween an annular bore 180. The sleeve 174 includes a radial outward extension 182 closing one axial end of the annular bore 180. The opposite axial end of the annular bore 180 is closed by a radial inward flange 186 of the hub 170. An annular piston 184 is disposed in the annular bore 180. A piston return spring 188 is disposed in the annular bore 180 so as to act between the radial outward extension 182 and the bottom of an inner axial bore of the annular piston 184. The piston return spring 188 biases the annular piston 184 toward the radial inward flange 186 and causes the annular piston 184 to assume a first or spring set position thereof illustrated in FIG. 8. The annular piston 184 has an axial end opposed to the radial inward flange 186 of the hub 170. A hydraulic pressure chamber 190 is defined within the annular bore 180 between the axial end of the annular piston 184 and the radial inward flange 186 of the hub 170. In operation, the annular piston 184 is urged against the piston return spring 188 to move toward the radial outward extension 182 in response to a hydraulic pressure build-up in the hydraulic pressure chamber 190 until it assumes a second position thereof illustrated in FIG. 9.

In order to cause an angular displacement of the sleeve 174 secured to the exhaust camshaft 166 relative to the exhaust cam pulley 168, the cylindrical wall 172 is formed with a helical gear 192 engaging a mating helical gear 194 which is formed on the outer peripheral wall of the annular piston 184. The inner peripheral wall of the annular piston 184 is formed with a helical gear 196 engaging a helical gear 198 which is formed on the outer peripheral wall of the sleeve 174. Owing to the helical gear arrangement, one directional movement of the annular piston 184 from the first position illustrated in FIG. 8 to the second position illustrated in FIG. 9 causes the sleeve 174 and thus the exhaust camshaft 166 to displace angularly relative to the exhaust cam pulley 168 by a predetermined angle, for instance approximately ten degrees. Reverse movement of the annular piston 184 from the second position to the first position thereof causes the sleeve 174 and the exhaust camshaft 166 to angularly displace relative to the exhaust cam pulley 168 in the reverse direction whereby the angular displacement of the exhaust camshaft 166 is reduced.

A manner of controlling the hydraulic pressure within the hydraulic pressure chamber 190 is now explained. As shown in FIGS. 8 and 9, the exhaust camshaft 166 has an axial fluid passage 200 communicated with the bore section 178. The fluid passage 200 is communicated with a through bore 202 formed in the bolt 176 which is received in the bore section 178 of the exhaust camshaft 166. The through bore 202 is open to a recess 204 which is formed in an inside surface of an end plug 206. The recess 204 of the end plug 206 is communicated with the hydraulic pressure chamber 190. The fluid passage 200 of the exhaust camshaft 166 is communicated via a radial port 208 with a hydraulic line 210, as shown in FIG. 1. As illustrated in FIG. 1, the hydraulic line 210 is connected to the oil pan 160 via a second hydraulic pressure control valve 211 and a recirculating line 212. The second hydraulic pressure control valve 211 is in the form of a three-port two-position type. The hydraulic line 210 is also connected to the oil pump 164 via a hydraulic line 213. The second hydraulic pressure control valve 211 is connected to a control unit 214 in a similar manner to the first hydraulic pressure control valve 161.

Figure 17:
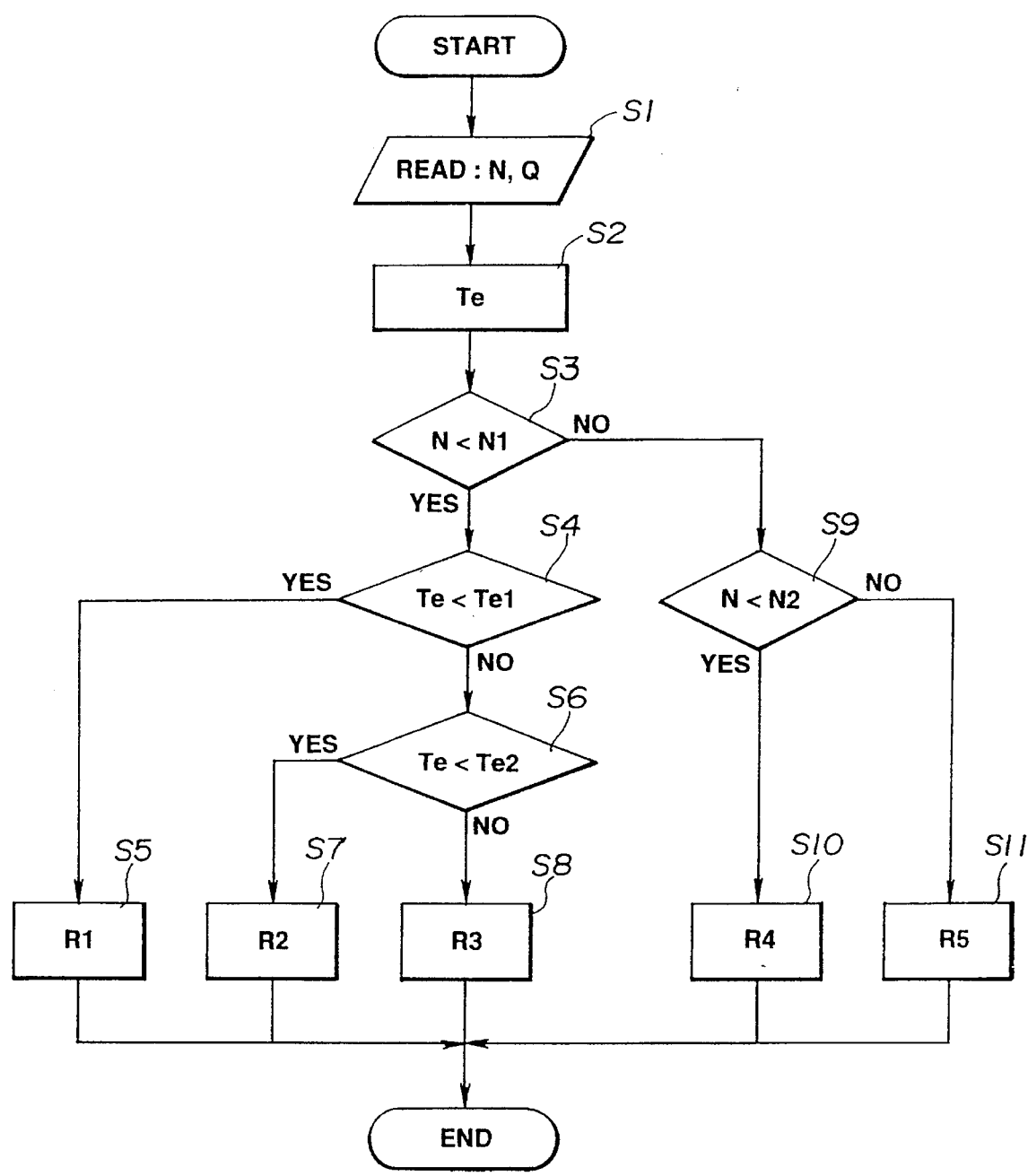
FIG. 17 is a flow diagram illustrating job procedure performed in an operation of the intake and exhaust valves.

Thus, the intake variable valve timing mechanism 20 and the exhaust variable valve timing mechanism 22 are operatively connected to the first hydraulic pressure control valve 161 and the second hydraulic pressure control valve 211, respectively, which are controlled by the control unit 214. As illustrated in FIG. 1, a crankangle sensor 216, an intake airflow meter 218 and a coolant temperature sensor 220 are connected to the control unit 214. The control unit 214 is of the microcomputer based control module including as usual a central processor unit (CPU), a read only memory (ROM), a random access memory (RAM), an input interface and an output interface. The control unit 214 recognizes operating conditions of the engine by reading sensor output signals from the crankangle sensor 216, intake airflow meter 218 and coolant temperature sensor 220. The crankangle sensor 216 generates an engine speed signal N. The intake airflow meter 218 generates an intake airflow rate signal Q. The coolant temperature sensor 220 generates a coolant temperature value signal T. The control unit 214 processes the information derived from reading operations of the engine speed signal N, intake airflow rate signal Q and coolant temperature value signal T to generate output signals to be supplied to the first and second hydraulic pressure control valves 161 and 211 for operating the intake variable valve timing mechanism 20 and exhaust variable valve timing mechanism 22, respectively. This will be specifically explained later along with a flow diagram as shown in FIG. 17, which illustrates a control program stored in the ROM. The control unit 214 is designed to control the first hydraulic pressure control valve 161 in a duty-ratio mode in which the hydraulic pressure supplied to the intake variable valve timing mechanism 20 varies continuously or steplessly. The control unit 214 may be so designed as to control the second hydraulic pressure control valve 211 in a duty-ratio mode for continuously changing the hydraulic pressure supplied to the exhaust variable valve timing mechanism 22.

A manner of operating the intake variable valve timing mechanism 20 will be explained hereinafter.

When the control unit 214 transmits an OFF operatively signal to the first hydraulic pressure control valve 161, the valve 161 is moved to its first valve position in which the hydraulic line 158 is fluidly communicated with the recirculating line 162. Hydraulic fluid, fed from the oil pump 164 under pressure, in the hydraulic pressure chamber 150 of the disk driver actuating mechanism 134 of the intake variable valve timing mechanism 20 is recirculated to the oil pan 160. This results in a decrease in pressure within the chamber 150. The decreased pressure within the chamber 150 allows the piston 146 to be placed by the basing force of the return spring 144 in the rest position indicated in full line of FIG. 3. Thus, the disk driver 108 is held in a position indicated in full line of FIG. 3. The annular disk 48 is placed in the first or concentric position in which the axis Y of the annular disk 48 is aligned with the axis X of the driver shaft 24 and in which the intake camshaft 30 is in a concentric relationship to the annular disk 48. In this position, the pins 74 and 76 are prevented from sliding motion thereof in the corresponding grooves 70 and 72. There exists no difference in annular phase between the annular disk 48 and the driver shaft 24 and between the annular disk 48 and the intake camshaft 30. Thus, the driver shaft 24, annular disk 48 and intake camshaft 30 are allowed to rotate synchronously and at uniform annular velocity. The intake valve 12 has a valve timing IV1 indicated in full line of FIG. 10 during the uniform rotation of the driver shaft 24, annular disk 48 and intake camshaft 30.

Figure 10:
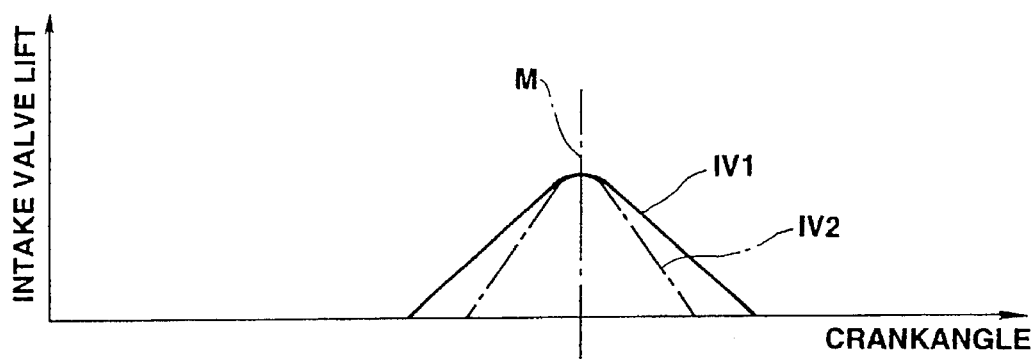
FIG. 10 is a valve timing diagram showing valve timings of the intake valve.
Figure 11:
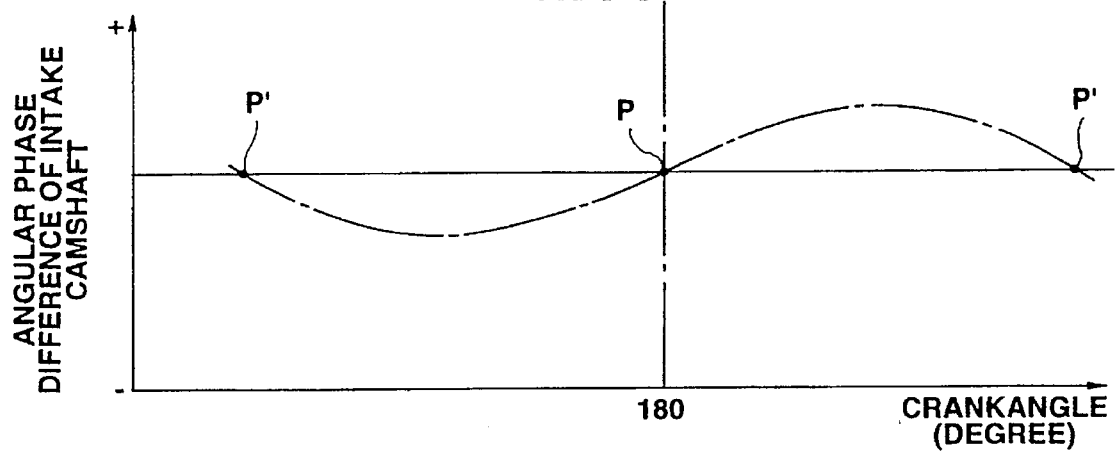
FIG. 11 is a graphic diagram showing a relation between crankangle and angular phase difference between the intake camshaft and driver shaft.

When the control unit 214 transmits an ON operatively signal to the first hydraulic pressure control valve 161, the valve 161 is moved to its second valve position in which the hydraulic line 158 is fluidly communicated with the oil pump 164 via the hydraulic line 165. Hydraulic fluid pressurized is supplied from the oil pump 164 to the hydraulic pressure chamber 150 of the disk driver actuating mechanism 134 of the intake variable valve timing mechanism 20. Pressure within the chamber 150 increases, causing the piston 146 to move against the return spring 144 from the rest position into the projecting position indicated in broken line of FIG. 3. Owing to the movement of the piston 146, the disk driver 108 is moved to a position indicated in broken line of FIG. 3. Thus, the annular disk 48 is placed in the second or eccentric position in which the axis Y of the annular disk 48 is in the position Y' offset from the axis X of the driver shaft 24. In such a case, the pins 74 and 76 are allowed to slide in the corresponding grooves 70 and 72 every rotating movement of the driver shaft 24. This causes asynchronous and ununiform rotating motions of the annular disk 48 and intake camshaft 30. Specifically explained, when the driver shaft 24 rotates to move the groove 72 from its downward position as viewed in FIG. 2 to a diametrically opposite upward position as viewed in FIG. 2, the pin 76 slides radially outwardly in the groove 72 from a position closest to the axis X of the driver shaft 24 to a position remotest therefrom. When the drive shaft 24 further rotates to move the groove 72 back to the downward position shown in FIG. 2, the pin 76 slides radially inwardly in the groove 72 from the remotest position to the closest position. When the pin 76, viz. the connecting point between the driver shaft 24 and the annular disk 48, moves in a predetermined angular range disposed upward as viewed in FIG. 3, during the sliding movement thereof every rotation of the driver shaft 24, the annular disk 48 rotates at a higher angular velocity than the driver shaft 24. On the other hand, the annular disk 48 rotates at a lower angular velocity than the driver shaft 24 when the pin 76 is moved in the remaining angular range excluding the predetermined upward angular range. On the similar ground, since it is assumed that the intake camshaft 30 which is driven by the annular disk 48, is offset downwardly as viewed in FIG. 2, relative to the annular disk 48, the intake camshaft 30 rotates at a higher angular velocity than the annular disk 48 when the pin 74 moves in a predetermined angular range disposed downward as viewed in FIG. 3, while the intake camshaft 30 rotates at a lower angular velocity than the annular disk 48 when the pin 74 moves in the remaining angular range excluding the predetermined downward angular range. Within the predetermined downward angular range, the cam lobe 39 formed in aligned relation to the groove 70 and therefore to the pin 74, comes into contact with the valve lifter 40. Since the pins 74 and 76 are displaced in a diametrically opposed relation, the timing where the pin 76 moves in the predetermined upward angular range is consistent with the timing where the pin 74 moves in the predetermined downward angular range. As will be understood from the above explanation, angular velocity of the intake camshaft 30 increases double relative to angular velocity of the driver shaft 24 in an operatively range of the intake camshaft 30 where the cam lobe 39 contacts the valve lifter 40. Thus, the eccentric arrangement of the annular disk 48 causes angular phase difference between the intake camshaft 30 and the driver shaft 24, which is indicated in broken line of FIG. 11. As shown in FIG. 11, angular phase difference of the intake camshaft 30 with respect to the driver shaft 24 is indicated by positive value and negative value. There are identical angular phase points P and P' in which no angular phase difference of the intake camshaft 30 with respect to the driver shaft 24 exists. The maximum valve lift for the intake valve 12 is obtained at the point P. At the points P and P', the pins 74 and 76 are aligned with a vertical line passing through the axes X and Y' as shown in FIG. 3. Owing to the angular phase difference of the intake camshaft 30 with respect to the driver shaft 24, the intake valve 12 has a valve timing IV2 indicated in broken line of FIG. 10. As illustrated in FIG. 10, when the angular phase difference is indicated by the negative value, a retarded opening timing of the intake valve 12 is provided. On the other hand, when the angular phase difference is indicated by the positive value, an advanced opening timing of the intake valve 12 is provided. Thus, the intake valve 12 is operated with a reduced opening duration.

As seen from FIGS. 10 and 11, valve lift of the intake valve 12 peaks at a predetermined crankangle which corresponds to the identical angular phase point P where the peak of the lobe 39 comes into contact with the valve lifter 40 and where the angular phase difference between the intake camshaft 30 and the driver shaft 24 is zero. The valve timings IV1 and IV2 are in symmetric relation with respect to reference line M passing through the predetermined-degree crankangle. Thus, the opening and closing timings of the intake valve 12 are altered by same amount relative to the crankangle.

Figure 12:
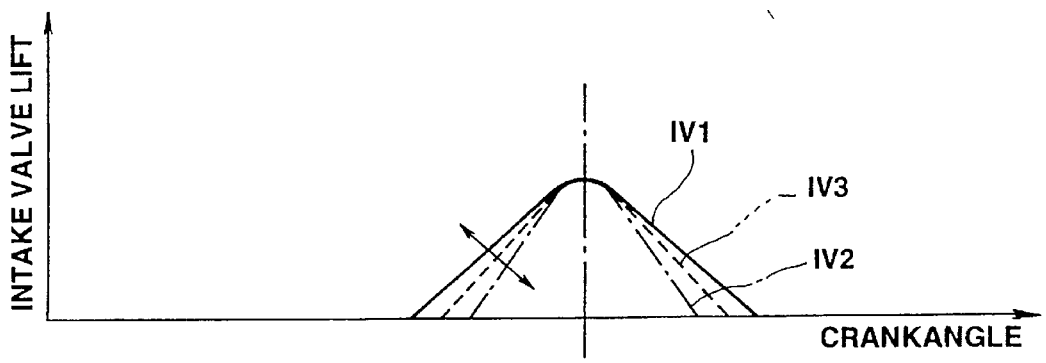
FIG. 12 is a valve timing diagram similar to FIG. 10 but showing another valve timing not shown in FIG. 10.

FIG. 12 shows different valve timings IV1, IV2 and IV3 of the intake valve 12 provided in response to engine operating conditions. The valve timing of the intake valve 12 is continuously variable between IV1, IV2 and IV3.

Figure 13:
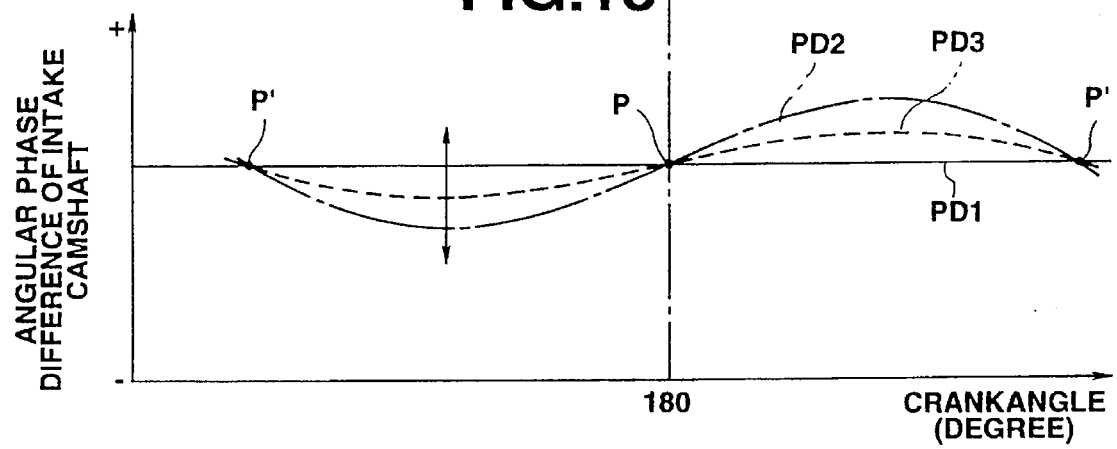
FIG. 13 is a graphic diagram similar to FIG. 11 but showing another relation between crankangle and angular phase difference between the intake camshaft and driver shaft.

FIG. 13 shows angular phase differences PD1, PD2 and PD3 of the intake camshaft 30 relative to the driver shaft 24, which cause tile corresponding valve timings IV1, IV2 and IV3.

A manner of operating the exhaust variable valve timing mechanism 22 will be explained hereinafter.

Figure 14:
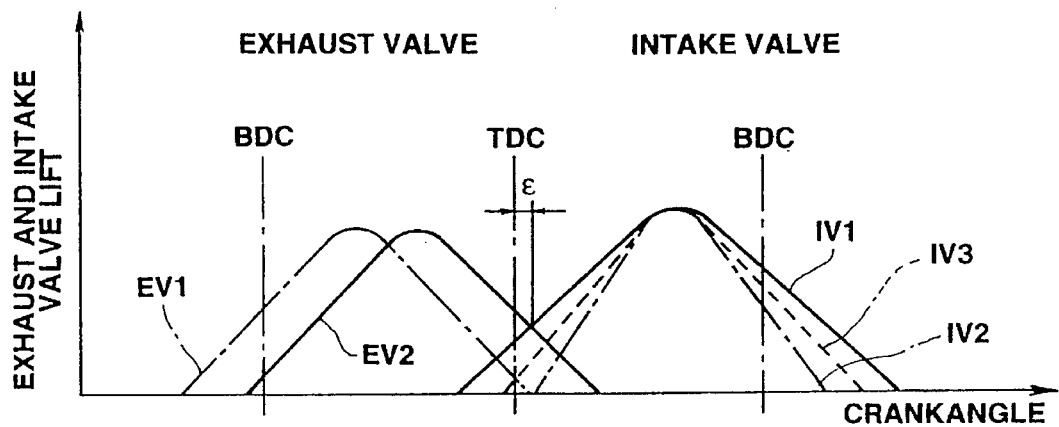
FIG. 14 is a valve timing diagram showing valve timings of the intake and exhaust valves during various engine operations.

When the control unit 214 transmits an OFF operatively signal to the second hydraulic pressure control valve 211, the valve 211 is moved to its first valve position in which the hydraulic line 210 is fluidly communicated with the oil pan 160 via the recirculating line 212. Pressurized hydraulic fluid in the hydraulic pressure chamber 190 of the exhaust variable valve timing mechanism 22 is recirculated to the oil pan 160. This causes reduction of hydraulic pressure within the chamber 190. The reduced pressure within the chamber 190 allows the piston 184 to be moved into the first position of FIG. 8 owing to bias of the return spring 188. In this position, angular displacement of the exhaust camshaft 166 relative to the exhaust cam pulley 168 is restricted and the exhaust valve 14 has a valve timing indicated by broken line EV1 of FIG. 14. As shown in FIG. 14, advanced opening and closing timings of the exhaust valve 14 are provided.

When the control unit 214 transmits an ON operatively signal to the second hydraulic pressure control valve 211, the valve 211 is moved to its second valve position in which the hydraulic line 210 is fluidly communicated with the oil pump 164 via the hydraulic line 213. Hydraulic fluid pressurized is supplied from the oil pump 164 to the hydraulic pressure chamber 190 of the exhaust variable valve timing mechanism 22. Pressure within the chamber 190 increases causing the piston 184 to move against the return spring 188 into the second position shown in FIG. 9. This increased pressure within the chamber 190 causes the exhaust camshaft 166 to angularly displace with respect to the exhaust cam pulley 168 by the predetermined angle. The exhaust valve 14 has a valve timing as indicated by full line EV2 of FIG. 14. As shown in FIG. 14, retarded opening and closing timings of the exhaust valve 14 are provided. The valve timings EV1 and EV2 for the exhaust valve 14 have a same predetermined valve opening duration.

Figure 15:
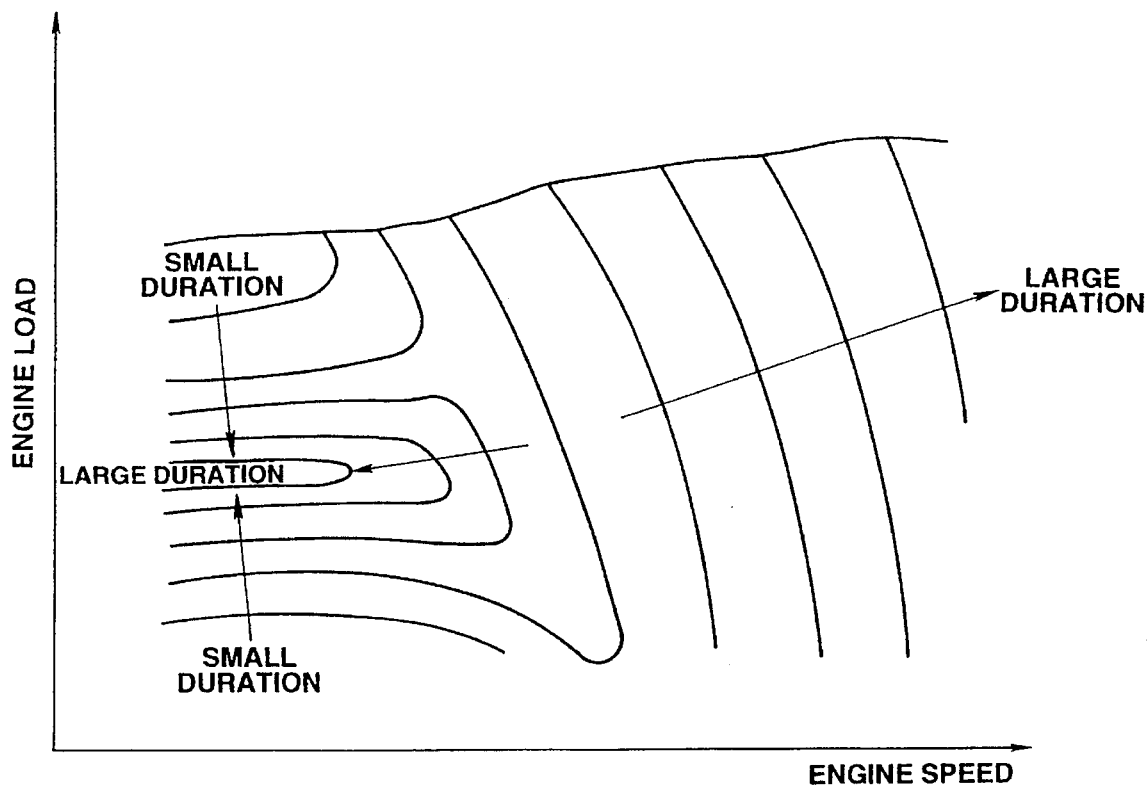
FIG. 15 is a map illustrating engine operating ranges and opening durations of the intake valve during the ranges.
Figure 16:
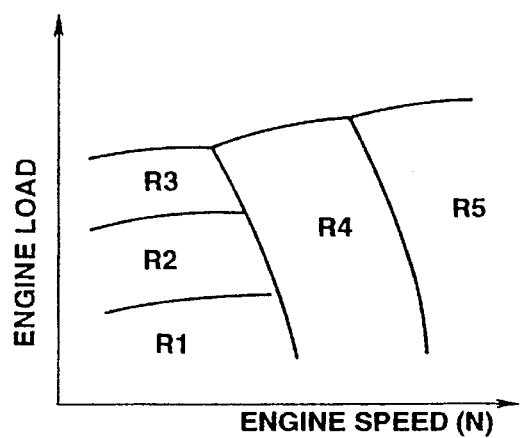
FIG. 16 is a map illustrating schematically and diagramatically the engine operating ranges of FIG. 15.

Referring to FIGS. 14–16, valve timings of the intake and exhaust valves 12 and 14 during engine operating ranges will be explained hereinafter.

FIG. 15 shows valve opening duration of the intake valve 12 which alters continuously or steplessly in response to operating conditions of the engine.

For easy understanding of variable valve timing control for the intake and exhaust valves 12 and 14, there is shown in FIG. 16 engine operating ranges R1, R2, R3, R4 and R5. As illustrated in FIG. 16, the engine operates at low speed with low load during the range R1, at low speed with medium load during the range R2, and at low speed with high load during the range R3. The engine operates at medium speed during the range R4, and at high speed during the range R5.

Within the range R1, the first hydraulic pressure control valve 161 for the intake valve 12 is in the second valve position and the second hydraulic pressure control valve 211 is in the first valve position. The intake variable valve timing mechanism 20 and the exhaust variable valve timing mechanism 22 are conditioned to provide appropriate valve timings of the intake and exhaust valves 12 and 14, respectively. The appropriate valve timings are indicated in broken lines IV2 and EV1 of FIG. 14. Both opening and closing timings at the valve timing EV1 of the exhaust valve 14 are advanced with respect to the opening and closing timings at the valve timing EV2 indicated in full line of FIG. 14. Specifically explained, the closing timing at the valve timing EV1 is advanced to be disposed immediately after a top dead center (TDC). The advanced closing timing of the exhaust valve 14 causes increased emission of the exhaust gas. At the same time, valve opening duration at the valve timing IV2 of the intake valve 12 is reduced with respect to valve opening duration at the valve timing IV1 indicated in full line of FIG. 14. An opening timing at the valve timing IV2 is retarded and a closing timing thereat is advanced with respect to the opening and closing timings at the valve timing IV1. Owing to the retarded opening timing of the intake valve 12 and the advanced closing timing of the exhaust valve 14, there is provided a reduced valve overlap between the intake and exhaust valves 12 and 14. The reduced valve overlap causes the exhaust gas to be prevented from sucking into an intake line (not shown). The advanced closing timing of the intake valve 12 allows appropriate mixing of fuel and air for the range R1, viz. low-speed/low-load operating range. This results in a stable combustion and an improved fuel economy during the low-speed/low-load operating range.

Within the range R2, the first hydraulic pressure control valve 161 for the intake valve 12 is in the first valve position and the second hydraulic pressure control valve 211 is in the second valve position. The intake variable valve timing mechanism 20 and the exhaust variable valve timing mechanism 22 are conditioned to provide appropriate valve timings of the intake and exhaust valves 12 and 14, respectively. The appropriate valve timings are indicated in broken lines IV1 and EV2 of FIG. 14. Both opening and closing timings at the valve timing EV2 of the exhaust valve 14 are retarded with respect to the opening and closing timings at the valve timing EV1. The retarded opening timing of the exhaust valve 14 is disposed immediately before a bottom dead center (BDC). This retarded opening timing of the exhaust valve 14 allows a greater effective expansion stroke to thereby promote conversion of the combustion energy into rotary energy for rotating the engine crankshaft. At the same time, valve opening duration at the valve timing IV1 of the intake valve 12 is increased with respect to valve opening duration at the valve timing IV2. An opening timing at the valve timing IV2 is advanced before the TDC and a closing timing thereat is retarded with respect to the opening and closing timings at the valve timing IV2. The retarded closing timing of the intake valve 12 causes reduction of pumping loss to thereby improve fuel economy. Owing to the advanced opening timing of the intake valve 12 and the retarded opening timing of the exhaust valve 14, there is provided an increased valve overlap shown in FIG. 14, between the intake and exhaust valves 12 and 14. As illustrated in FIG. 14, the peak of the increased valve overlap is disposed to be delayed after the TDC by a predetermined amount $\epsilon$. This increased valve overlap maintains high temperature of the exhaust gas remaining in the combustion chamber, serving for increased combustion without deterioration caused by drop of the exhaust gas temperature. Owing to the delayed peak of the increased valve overlap, the exhaust gas entering the exhaust line through the exhaust valve 14 is sucked into the combustion chamber due to pressure decrease within the combustion chamber which is caused by descending motion of a piston head (not shown) within the engine cylinder. This suction serves for temperature raise up of the exhaust gas in the combustion chamber. The suction also allows an increase in amount of the exhaust gas remaining in the combustion chamber. This leads to a decrease of fuel-air mixing ratio, causing an increase in throttle opening degree to thereby promote the reduction of pumping loss. As a result, an improved fuel economy is obtained during the low-speed/medium-load operating ranges R2 which is often used upon driving in an urban area.

Within the range R4, the first hydraulic pressure control valve 161 for the intake valve 12 is in the second valve position and the second hydraulic pressure control valve 211 is in the first valve position. The intake variable valve timing mechanism 20 and the exhaust variable valve timing mechanism 22 are conditioned to provide appropriate valve timings of the intake and exhaust valves 12 and 14, respectively. The appropriate valve timings are indicated at IV2 and EV1 of FIG. 14 similar to the range R1. Therefore, detailed explanations for the valve timings provided within the low-speed/high-load operating range 3 are omitted but substantially same effects are achieved.

Within the range R4, the first hydraulic pressure control valve 161 for the intake valve 12 is in a valve position disposed between the first and second valve positions, and the second hydraulic pressure control valve 211 is in the first valve position. The intake variable valve timing mechanism 20 and the exhaust variable valve timing mechanism 22 are conditioned to provide appropriate valve timings of the intake and exhaust valves 12 and 14, respectively. The appropriate valve timings are indicated in dotted line IV3 and in broken line EV1 of FIG. 14. Within this range R4, the valve timing EV1 of the exhaust valve 14 is similar to that within the range R1. Valve opening duration at the valve timing IV3 of the intake valve 12 intermediates between the reduced valve opening duration at the valve timing IV2 and the increased valve opening duration at the valve timing IV1. Opening and closing timings at the valve timing IV3 are middle disposed between the opening and closing timings at the valve timing IV2 and the opening and closing timings at the valve timing IV1. Owing to the advanced closing timing of the exhaust valve 14 and the middle opening timing of the intake valve 12, there is provided an appropriate valve overlap for gas exchanging efficiency and an improved torque during the medium-speed operating range R4.

Within the range R5, the first hydraulic pressure control valve 161 for the intake valve 12 is in the first valve position and the second hydraulic pressure control valve 211 is in the second valve position. The intake variable valve timing mechanism 20 and the exhaust variable valve timing mechanism 22 are conditioned to provide appropriate valve timings of the intake and exhaust valves 12 and 14, respectively. The appropriate valve timings are IV1 and EV2 of FIG. 14 similar to the range R2. Therefore, detailed explanations for the valve timings provided within the range R5 are omitted. The retarded closing timing of the intake valve 12 causes an improved charging efficiency. The increased valve overlap between the intake and exhaust valves 12 and 14 causes an increased scavenging efficiency to thereby obtain an increased torque during the high-speed operating range R5.

Table 1 shows the aforementioned valve timings for the intake and exhaust valves 12 and 14 during the engine operating ranges R1–R5.

TABLE 1

| Engine Operating Range | Intake Valve Opening Duration | Exhaust Valve Opening Timing/ | Exhaust Valve Closing Timing |
| --- | --- | --- | --- |
| R1 | Reduced | Advanced | Advanced |
| R2 | Increased | Retarded | Retarded |
| R3 | Reduced | Advanced | Advanced |
| R4 | Intermediate | Advanced | Advanced |
| R5 | Increased | Retarded | Retarded |

Referring to FIG. 17, a manner of operating the engine will now be explained.

As illustrated in FIG. 17, at a step S1, a reading operation of the output signals from the crankangle sensor 216 and intake airflow meter 218 is performed and the results are stored as an engine speed data N and an intake airflow rate data Q. At a step S2, 25 a basic fuel amount Te as expressed by a function of N and Q is determined. There is an interrogation at a step S3 whether N is less than a first predetermined engine speed value N1. If this is the case, there is another interrogation at a step S4 whether the basic amount Te is less than a first predetermined reference Te1. If the interrogation at the step S4 results in affirmative, the routine proceeds to a step S5. At the step S5, an appropriate valve timing for the range R1 shown in FIG. 16 is set. The appropriate valve timing for the range R1 is illustrated in broken lines IV2 and EV1 of FIG. 14. If the interrogation at the step S4 results in negative, the routine proceeds to a step S6. There is another interrogation at the step S6, whether the basic amount Te is less than a second predetermined reference Te2. If the interrogation at the step S6 results in affirmative, the routine proceeds to a step S7. At the step S7, an appropriate valve timing for the range R2 shown in FIG. 16 is set. The appropriate valve timing for the range R2 is illustrated in full lines IV1 and EV2 of FIG. 14. If the interrogation at the step S6 results in negative, the routine proceeds to a step S8. At the step S8, an appropriate valve timing for the range R3 shown in FIG. 16 is set. The appropriate valve timing for the range R3 is similar to the valve timing for the range R1 as illustrated in FIG. 14. If the interrogation at the step S3 results in negative, the routine proceeds to a step S9. There is another interrogation at the step S9, whether N is less than a second predetermined engine speed value N2. If the interrogation at the step S9 results in affirmative, the routine proceeds to a step S10. At the step S10, an appropriate valve timing for the range R4 shown in FIG. 16 is set. The appropriate valve timing for the range R4 is illustrated in dotted line IV3 and full line EV2 of FIG. 14. If the interrogation at the step S9 results in negative, the routine proceeds to a step S11. At the step S11, an appropriate valve timing for the range R5 shown in FIG. 16 is set. The appropriate valve timing for the range R5 is similar to the valve timing for the range R2 as illustrated in FIG. 14. The output signals are supplied to the first and second hydraulic pressure control valves 161 and 211 to establish valve timing set at one of the steps S5, S7, S8, S10 and S11.

What is claimed is:

1. A system for operating an internal combustion engine including an intake valve and an exhaust valve, the system comprising:

a crankangle sensor for generating an engine speed signal;

an intake airflow meter for generating an intake airflow rate signal;

an exhaust valve gear for the exhaust valve, said exhaust valve gear incorporating an exhaust variable valve timing mechanism;

an intake valve gear for the intake valve, said intake valve gear incorporating an intake variable valve timing mechanism;

a first hydraulic pressure control valve operatively connected with said intake variable valve timing mechanism;

a second hydraulic pressure control valve operatively connected with said exhaust variable valve timing mechanism; and a controller electrically connected with said crankangle sensor and said intake airflow meter, said controller being operatively connected with said first and second hydraulic pressure control valves;

said controller being operatively to determine an engine speed data based on said engine speed signal and an intake airflow rate data based on said intake airflow rate signal to determine a fuel amount;

said controller being operatively to determine a low-speed and low-load operating range of the engine when said engine speed data is less than a first reference engine speed, and said fuel amount is less than a first reference fuel amount;

said controller being operatively to determine a low-speed and medium-load operating range of the engine when said engine speed data is less than said first reference engine speed, and said fuel amount is not less than said first reference fuel amount but is less than a second reference fuel amount;

said controller being operatively to determine a low-speed and high-load operating range of the engine when said engine speed data is less than said first reference engine speed, and said fuel amount is not less than said second reference fuel amount;

said controller being operatively to determine a medium-speed operating range of the engine when said engine speed data is not less than said first reference engine speed but is less than a second reference engine speed;

said controller being operatively to determine a high-speed operating range of the engine when said engine speed data is not less than said second reference engine speed;

said controller being operatively responsive to said low-speed and low-load operating range of the engine and said low-speed and high-load operating range of the engine to control said second hydraulic pressure control valve for operating said exhaust variable valve timing mechanism to provide advanced opening and closing timings of the exhaust valve, and at the same time control said first hydraulic pressure control valve for operating said intake variable valve timing mechanism to decrease an opening duration of the intake valve to provide a retarded opening timing thereof and an advanced closing timing thereof to cause a reduced valve overlap between the intake and exhaust valves;

said controller being operatively responsive to said low-speed and medium-load operating range of the engine and said high-speed operating range of the engine to control said second hydraulic pressure control valve for operating said exhaust variable valve timing mechanism to provide a retarded opening timing of the exhaust valve immediately before a bottom dead center of an engine piston stroke and a retarded closing timing thereof, and at the same time control said first hydraulic pressure control valve for operating said intake variable valve timing mechanism to increase the opening duration of the intake valve to provide an advanced opening timing thereof and a retarded closing timing thereof to cause an increased valve overlap between the intake and exhaust valves, a peak of said valve overlap is positioned after a top dead center of the engine piston stroke, said peak of said valve overlap being a point during said valve overlap at which the lift of said intake valve and said exhaust valve is maximum; and said controller being operatively responsive to said medium-speed operating range of the engine to control said second hydraulic pressure control valve for operating said exhaust variable valve timing mechanism to provide the advanced opening and closing timings of the exhaust valve, and at the same time control said first hydraulic pressure control valve for operating said intake variable valve timing mechanism to cause a medium opening duration of the intake valve between the reduced opening duration and the increased opening duration to cause an intermediate valve overlap between the intake and exhaust valves.

2. A system for operating an internal combustion engine as recited in claim 1, wherein said exhaust variable valve timing mechanism is operatively to move opening and closing timings of the exhaust valve with a predetermined opening duration of the exhaust valve, said intake variable valve timing mechanism is operatively to alter the opening duration of the intake valve, said intake variable valve timing mechanism includes a driver shaft having an axis and rotatable about said axis in timed relation with an engine operation, an intake camshaft disposed coaxially with said axis of said driver shaft, and means operatively responsive to operating ranges of the engine to control rotation of said intake camshaft, said means being operatively responsive to said low-speed and low-load operating range of the engine and said low-speed and high-load operating range of the engine to control said intake camshaft for nonuniform rotation of said intake camshaft relative to said driver shaft to provide said decreased opening duration of the intake valve;

said means being operatively responsive to said low-speed and medium-load operating range of the engine and said high-speed operating range of the engine to control said intake camshaft for uniform rotation of said intake camshaft relative to said driver shaft to provide said increased opening duration of the intake valve.

3. A system as claimed in claim 2, wherein said means includes an annular disk in driving connection with said driver shaft and said intake camshaft, said annular disk having an axis and being shiftable between a first concentric position in which said axis of said annular disk is aligned with said axis of said driver shaft, and a second eccentric position in which said axis of said annular disk is offset from said axis of said driver shaft, and disk driving means for moving said annular disk between said first concentric position and said second eccentric position in response to engine operations, and wherein, when said annular disk is moved to said first concentric position, said intake camshaft is operated to rotate uniformly in speed with said driver shaft, and when said annular disk is moved to said second eccentric position, said intake camshaft is operated to rotate nonuniformly in speed with said driver shaft.

4. A system as claimed in claim 3, wherein said disk driving means is so constructed and arranged as to continuously move said annular disk between said first concentric position and said second eccentric position.

5. A system as claimed in claim 2, wherein said intake camshaft has a cam with a lobe, a peak of said lobe being in contact with the intake valve to provide a maximum valve lift of the intake valve at which no angular phase difference between said intake camshaft and said driver shaft exists.

6. A method for operating an internal combustion engine including an intake valve and an exhaust valve, the method comprising the steps of:

generating signals respectively indicative of engine speed and intake airflow rate to obtain an engine speed data and an intake airflow rate data;

determining a fuel amount based on said engine speed data and said intake airflow rate data;

comparing said engine speed data with a reference engine speed;

comparing said fuel amount with a reference fuel amount;

determining an operating range of the engine on the basis of results of the comparison between said engine speed data and said reference engine speed, and the comparison between said fuel amount and said reference fuel amount, said operating range of the engine including a low-speed and low-load operating range, a low-speed and medium-load operating range, a low-speed and high-load operating range, a medium-speed operating range, and a high-speed operating range;

providing, responsive to said low-speed and low-load operating range and said low-speed and high-load operating range, advanced opening and closing timings of the exhaust valve, and at the same time providing, responsive to said low-speed and low-load operating range and said low-speed and high-load operating range, a reduced opening duration of the intake valve to provide a retarded opening timing thereof and an advanced closing timing thereof to cause a reduced valve overlap between the intake and exhaust valves;

providing, responsive to said low-speed and medium-load operating range and said high-speed operating range, a retarded opening timing of the exhaust valve immediately before a bottom dead center of an engine piston stroke and a retarded closing timing thereof, and at the same time providing, responsive to said low-speed and medium-load operating range and said high-speed operating range, an increased opening duration of the intake valve to provide an advanced opening timing thereof and a retarded closing timing thereof to cause an increased valve overlap between the intake and exhaust valves; and providing, responsive to said medium-speed operating range, the advanced opening and closing timings of the exhaust valve, and at the same time providing, responsive to said medium-speed operating range, a medium opening duration of the intake valve between the reduced opening duration and the increased opening duration to provide a middle opening timing thereof between the retarded opening timing thereof and the advanced opening timing thereof and a middle closing timing thereof between the advanced closing timing thereof and the retarded closing timing thereof to cause an intermediate valve overlap between the intake and exhaust valves.

7. A system for operating an internal combustion engine including an intake valve and an exhaust valve, the system comprising:

a crankangle sensor for generating an engine speed signal;

an intake airflow meter for generating an intake airflow rate signal;

an exhaust valve gear for the exhaust valve, said exhaust valve gear incorporating an exhaust variable valve timing mechanism;

an intake valve gear for the intake valve, said intake valve gear incorporating an intake variable valve timing mechanism;

a first hydraulic pressure control valve operatively connected with said intake variable valve timing mechanism;

a second hydraulic pressure control valve operatively connected with said exhaust variable valve timing mechanism; and a controller electrically connected with said crankangle sensor and said intake airflow meter, said controller being operatively connected with said first and second hydraulic pressure control valves;

said controller being operatively to determine an engine speed data based on said engine speed signal and an intake airflow rate data based on said intake airflow rate signal to determine a fuel amount;

said controller being operatively to determine a low-speed and low-load operating range of the engine when said engine speed data is less than a first reference engine speed, and said fuel amount is less than a first reference fuel amount;

said controller being operatively to determine a low-speed and medium-load operating range of the engine when said engine speed data is less than said first reference engine speed, and said fuel amount is not less than said first reference fuel amount but is less than a second reference fuel amount;

said controller being operatively to determine a low-speed and high-load operating range of the engine when said engine speed data is less than said first reference engine speed, and said fuel amount is not less than said second reference fuel amount;

said controller being operatively to determine a medium-speed operating range of the engine when said engine speed data is not less than said first reference engine speed but is less than a second reference engine speed;

said controller being operatively to determine a high-speed operating range of the engine when said engine speed data is not less than said second reference engine speed;

said controller being operatively responsive to said low-speed and low-load operating range of the engine and said low-speed and high-load operating range of the engine to control said second hydraulic pressure control valve for operating said exhaust variable valve timing mechanism to provide advanced opening and closing timings of the exhaust valve, and at the same time control said first hydraulic pressure control valve for operating said intake variable valve timing mechanism to decrease an opening duration of the intake valve to provide a retarded opening timing thereof and an advanced closing timing thereof to cause a reduced valve overlap between the intake and exhaust valves;

said controller being operatively responsive to said low-speed and medium-load operating range of the engine and said high-speed operating range of the engine to control said second hydraulic pressure control valve for operating said exhaust variable valve timing mechanism to provide a retarded opening timing of the exhaust valve immediately before a bottom dead center of an engine piston stroke and a retarded closing timing thereof, and at the same time control said first hydraulic pressure control valve for operating said intake variable valve timing mechanism to increase the opening duration of the intake valve to provide an advanced opening timing thereof and a retarded closing timing thereof to cause an increased valve overlap between the intake and exhaust valves, a peak of said valve overlap is positioned after a top dead center of the engine piston stroke, said peak of said valve overlap being a point during said valve overlap at which the lift of said intake valve and said exhaust valve is equivalent; and said controller being operatively responsive to said medium-speed operating range of the engine to control said second hydraulic pressure control valve for operating said exhaust variable valve timing mechanism to provide the advanced opening and closing timings of the exhaust valve, and at the same time control said first hydraulic pressure control valve for operating said intake variable valve timing mechanism to cause a medium opening duration of the intake valve between the reduced opening duration and the increased opening duration to cause an intermediate valve overlap between the intake and exhaust valves.

8. A system for operating an internal combustion engine as recited in claim 7, wherein said exhaust variable valve timing mechanism is operatively to move opening and closing timings of the exhaust valve with a predetermined opening duration of the exhaust valve, said intake variable valve timing mechanism is operatively to alter the opening duration of the intake valve, said intake variable valve timing mechanism includes a driver shaft having an axis and rotatable about said axis in timed relation with an engine operation, an intake camshaft disposed coaxially with said axis of said driver shaft, and means operatively responsive to operating ranges of the engine to control rotation of said intake camshaft, said means being operatively responsive to said low-speed and low-load operating range of the engine and said low-speed and high-load operating range of the engine to control said intake camshaft for nonuniform rotation of said intake camshaft relative to said driver shaft to provide said decreased opening duration of the intake valve;

said means being operatively responsive to said low-speed and medium-load operating range of the engine and said high-speed operating range of the engine to control said intake camshaft for uniform rotation of said intake camshaft relative to said driver shaft to provide said increased opening duration of the intake valve.

9. A system as claimed in claim 8, wherein said means includes an annular disk in driving connection with said driver shaft and said intake camshaft, said annular disk having an axis and being shiftable between a first concentric position in which said axis of said annular disk is aligned with said axis of said driver shaft, and a second eccentric position in which said axis of said annular disk is offset from said axis of said driver shaft, and disk driving means for moving said annular disk between said first concentric position and said second eccentric position in response to engine operations, and wherein, when said annular disk is moved to said first concentric position, said intake camshaft is operated to rotate uniformly in speed with said driver shaft, and when said annular disk is moved to said second eccentric position, said intake camshaft is operated to rotate nonuniformly in speed with said driver shaft.

10. A system as claimed in claim 9, wherein said disk driving means is so constructed and arranged as to continuously move said annular disk between said first concentric position and said second eccentric position.

11. A system as claimed in claim 8, wherein said intake camshaft has a cam with a lobe, a peak of said lobe being in contact with the intake valve to provide a maximum valve lift of the intake valve at which no angular phase difference between said intake camshaft and said driver shaft exists.

* * * * *